B. L. Phillips,
Steam-Engine Valve-Gear.
N° 17,583.                Patented June 16, 1857.
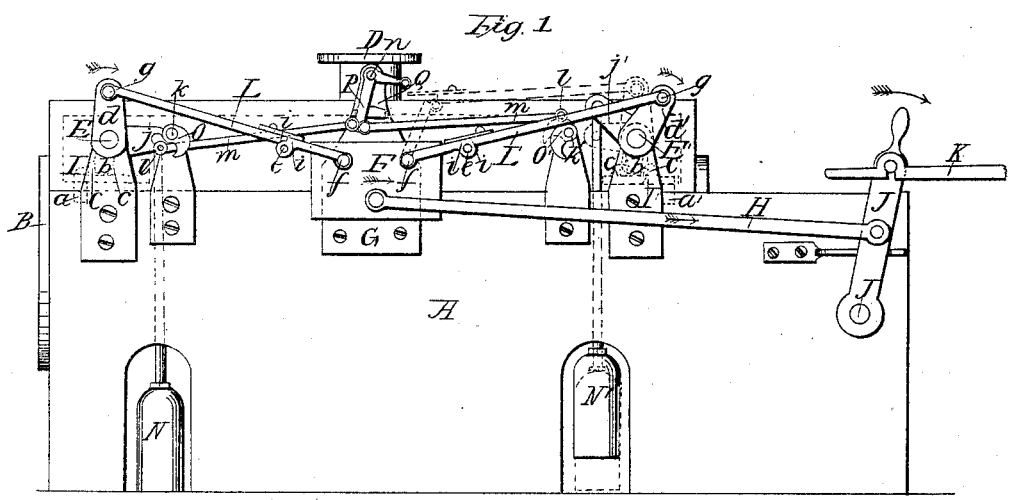
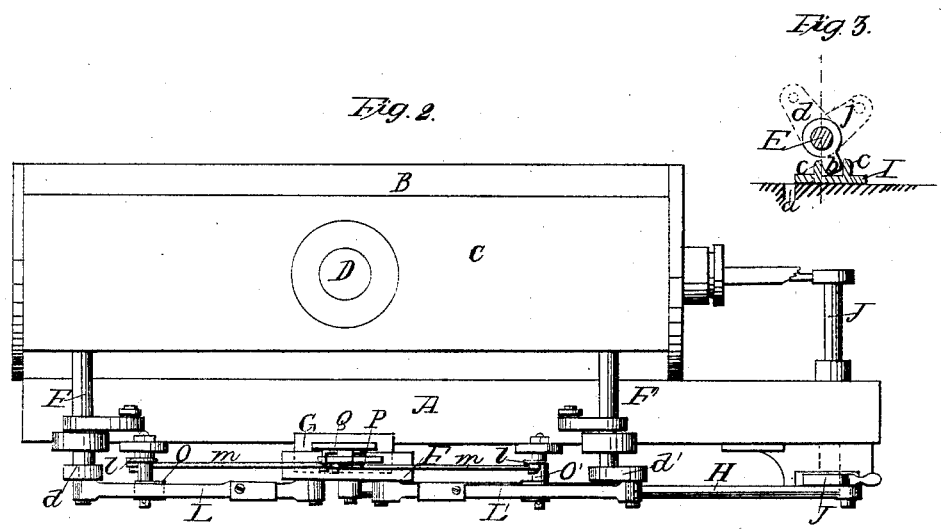

UNITED STATES PATENT OFFICE.

BENJN. L. PHILLIPS, OF PROVIDENCE, RHODE ISLAND.

VALVE CONNECTION FOR STEAM-ENGINES.

Specification of Letters Patent No. 17,583, dated June 16, 1857.

*To all whom it may concern:*

Be it known that I, BENJAMIN L. PHILLIPS, of the city of Providence, in the county of Providence and State of Rhode Island, have invented a new and useful Improvement in Valve Connections for Engines Operated by Steam or other Expansive Fluid; and I do hereby declare that the following is a full, clear, and exact description of the same, reference being had to the accompanying drawings, making a part of this specification.

My invention is an improvement in that class of steam engines in which the valves are closed by other means than the motion derived from the engine, and consists in interposing jointed bars or rods, between the valves and the connecting block, to be operated upon by cams or stops, for cutting off the steam at different points in the stroke without disconnecting the valves from the said mechanism.

In the accompanying drawings, Figure 1, is a side elevation of the cylinder and part of the framing of a horizontal steam engine arranged with my improved valve connection; Fig. 2, is a plan of the same; Fig. 3, is a section of one of the valves and its seat, and of the rock-shaft by which the valve is moved.

Like letters designate corresponding parts in all the figures.

A, is part of the framing of the engine; B, the cylinder; C, the steam chest, on the top of the cylinder; D, the induction steam pipe; I, I', the induction valves, both shown in dotted lines in Fig. 1, and one shown in Fig. 3.

E, E', are two rock-shafts arranged transversely to the cylinder, and extending into the steam chest, each being furnished with a tooth $b$, which works in a space in the back of each valve, so that by the oscillation of the rock shafts, motion is imparted to the valves to open and close the ports.

The connecting block F, slides on a fixed stand G, which is bolted to the framing A. Said block receives a reciprocating motion through a rod H, attached to an arm J, on a rock-shaft J, which derives motion through the eccentric-rod K. The block is connected by two rods L, L', with two arms $d$, $d'$, that are firmly secured, one to each of the rock-shafts E, E'.

The rods L, L', are constructed with joints $e$, $e$, the pivots of these joints being arranged out of line with the connecting pins $f$, $f$, and $g$, $g$, substantially as shown in Fig. 1. These joints open only in one direction, the abutting ends of the two parts of the rods keeping said rods straight when a pushing force is applied endwise thereto; and to give additional strength to the joints, abutting pieces $i$, $i$, may be applied to the backs thereof, as represented in the same figure.

Near the rods L, L', are two cams O, O', arranged so as to turn on two fixed studs $k$, $k$, attached to the framing of the engine; and these cams have arms $l$, $l$, attached to them, to connect them, by rods $m$, $m$, with an elbow lever P, which is movable on a fixed stud $n$, in a standard Q, attached to the framing A. By means of this lever P, both cams are adjusted at the same time to such positions that the rods L, L', will come in contact with them at different points of the strokes of the piston, and thereby cause the rods to be bent far enough for the centers $e$, $e$, to pass the line of culmination between the centers of the connecting pins $l$, $g$; then, by the action of weights N, N', suspended from two arms $j$, $j'$, secured one to each of the rock-shafts E, E', the valves are suddenly closed. The rods L, L', are straightened again by the returning movement of the connecting block F. The positions of the rods when bent, and of the parts connected therewith, are indicated by red lines, at the right hand, in Fig. 1. It will be seen that by adjusting the cams nearer the rods, the steam will be cut off earlier in the stroke; and vice versa. The lever P may be adjusted by hand, or connected with a governor to control the speed of the engine.

What I claim as my invention, is—

Interposing the jointed bars or rods L, L', to be operated upon by the cams O, O', or their equivalents, between the valves and the connecting block F, substantially as and for the purposes herein set forth.

BENJN. L. PHILLIPS.

Witnesses:
 HENRY MARTIN,
 ALBERT HEWITT.